United States Patent
Cline et al.

(10) Patent No.: US 9,457,914 B1
(45) Date of Patent: Oct. 4, 2016

(54) BRINGING CRITICAL NOTIFICATIONS TO A PILOT VIA EYE TRACKING

(71) Applicant: Rockwell Collins, Inc., Cedar Rapids, IA (US)

(72) Inventors: Thomas W. Cline, Fairfax, IA (US); Jorge A. Alvarez, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 242 days.

(21) Appl. No.: 13/902,054

(22) Filed: May 24, 2013

(51) Int. Cl.
*G08B 23/00* (2006.01)
*B64D 45/00* (2006.01)

(52) U.S. Cl.
CPC .................................. *B64D 45/00* (2013.01)

(58) Field of Classification Search
CPC ..................................................... B64D 45/00
USPC ............ 340/945, 963, 971, 973, 980; 345/8; 701/9, 14
See application file for complete search history.

(56) References Cited

U.S. PATENT DOCUMENTS

| | | | |
|---|---|---|---|
| 5,339,244 A * | 8/1994 | Stiles et al. | 701/14 |
| 5,454,074 A * | 9/1995 | Hartel et al. | 715/710 |
| 5,739,769 A * | 4/1998 | Vladimir et al. | 340/945 |
| 6,043,757 A * | 3/2000 | Patrick | 340/963 |
| 2004/0061041 A1* | 4/2004 | Ben-Ari et al. | 250/203.1 |
| 2006/0164219 A1* | 7/2006 | Knoll | 340/435 |
| 2010/0079270 A1* | 4/2010 | Krautter | B60K 35/00 340/436 |
| 2010/0240988 A1* | 9/2010 | Varga et al. | 600/425 |
| 2011/0063137 A1* | 3/2011 | Pimouguet et al. | 340/963 |
| 2012/0081236 A1* | 4/2012 | Best et al. | 340/945 |
| 2012/0271484 A1* | 10/2012 | Feit | B60W 50/14 701/1 |

* cited by examiner

*Primary Examiner* — Brent Swarthout
(74) *Attorney, Agent, or Firm* — Angel N. Gerdzhikov; Donna P. Suchy; Dnaiel M. Barbieri (57) ABSTRACT

The present disclosure is directed to a method for providing an alert to a pilot. The method includes the step of receiving a plurality of alerts. The method also includes the step of identifying a highest priority alert from the plurality of alerts. An additional step of the method includes determining a current view of the pilot. The method also includes the step of presenting the highest priority alert within the current view of the pilot.

20 Claims, 6 Drawing Sheets

BRINGING CRITICAL NOTIFICATIONS TO A PILOT VIA EYE TRACKING

TECHNICAL FIELD

The present disclosure generally relates to the field of flight display applications and more particularly to a system and method for bringing critical notifications to a pilot via eye tracking.

BACKGROUND

Currently, multiple flight display applications may be responsible for providing alerts to a pilot. For example, various alerts may be provided by any of the following: Terrain Awareness and Warning Systems (TAWS), Traffic Collision Avoidance Systems (TCAS), Crew Alerting Systems (CAS), Surface Management Systems (SMS), Flight Management Systems (FMS), Flight Control Systems (FCS), and the like. Alerts may be displayed in different locations throughout the cockpit by different systems, making it difficult for pilots to identify and respond to critical alerts. In some cases, multiple alerts may become active at the same time in different locations within the cockpit and it can be difficult for a pilot to determine which message should be acknowledged first or which display to review first.

Therefore, there exists a need for improved systems and methods for providing alerts and information to pilots.

SUMMARY

The present disclosure is directed to a method for providing an alert to a pilot. The method includes the step of receiving a plurality of alerts. The method also includes the step of identifying a highest priority alert from the plurality of alerts. An additional step of the method includes determining a current view of the pilot. The method also includes the step of presenting the highest priority alert within the current view of the pilot.

The present disclosure is also directed to a system for presenting an alert to a pilot. The system includes an eye tracking system configured for detecting a current view of the pilot. The eye tracking system is in communication with a processor. The processor is configured to receive the current view of the pilot from the eye tracking system. The processor is also configured to receive a plurality of alerts for the aircraft, prioritize the alerts, and identify an alert having a highest priority of the plurality of alerts. The processor is also in communication with an indicator system. The indicator system is configured to receive the alert having the highest priority and present the alert having the highest priority within the current view of the pilot. Using the system, it is possible to bring high priority alerts to the pilot's gaze without requiring the pilot to search for the alert.

The present disclosure is also directed to a method for providing information to a pilot. The method includes the step of determining a current view of the pilot and presenting the information within the current view of the pilot. The method also includes the step of receiving an input from the pilot in response to the presented information. An additional step of the method includes presenting updated information based on the input.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
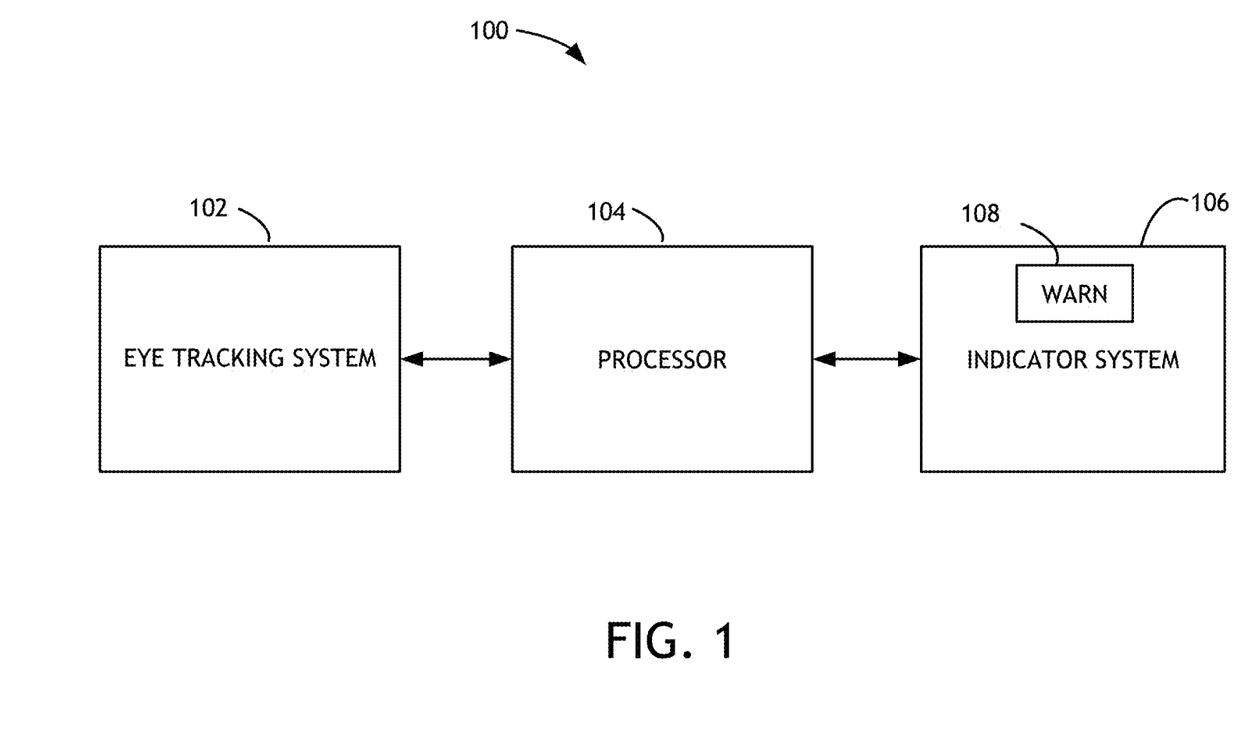
FIG. 1 is a diagram of a system for presenting an alert to a pilot.

The present disclosure is directed to systems and methods for bringing notifications to a pilot via eye tracking. Referring generally to FIG. 1, a system 100 for presenting an alert to a pilot is provided. The system 100 includes an eye tracking system 102 configured to detect a current view of the pilot. The eye tracking system 102 is in communication with a processor 104. The processor 104 is configured to receive the current view of the pilot from the eye tracking system 102. The processor 104 is also configured to receive a plurality of alerts for the aircraft, prioritize the alerts, and identify an alert having a highest priority of the plurality of alerts. The processor 104 is also in communication with an indicator system 106. The indicator system 106 is configured to receive the alert 108 having the highest priority and present the alert 108 having the highest priority within the current view of the pilot. Using the system 100, it is possible to bring high priority alerts to the pilot's gaze without requiring the pilot to search for the alert.

Figure 2:
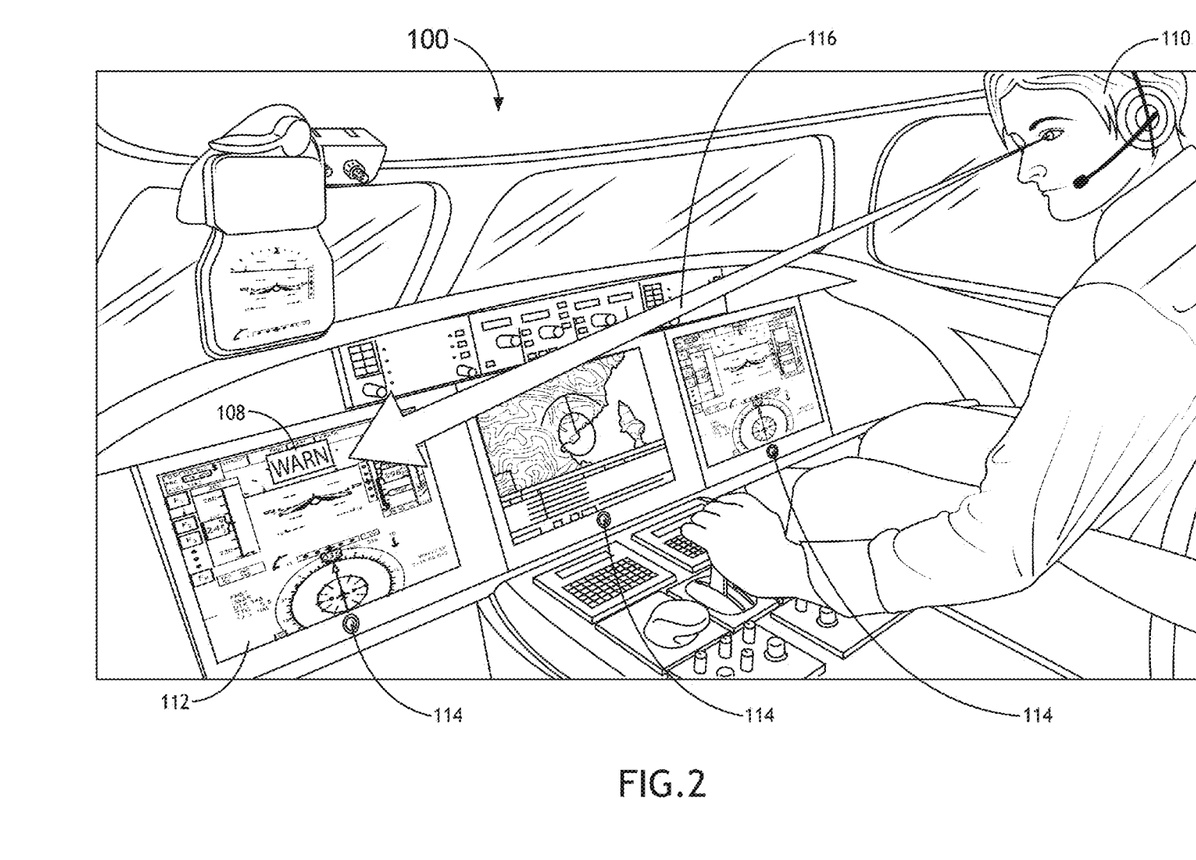
FIG. 2 is a view of a cockpit including a system for presenting an alert to a pilot.
Figure 3:
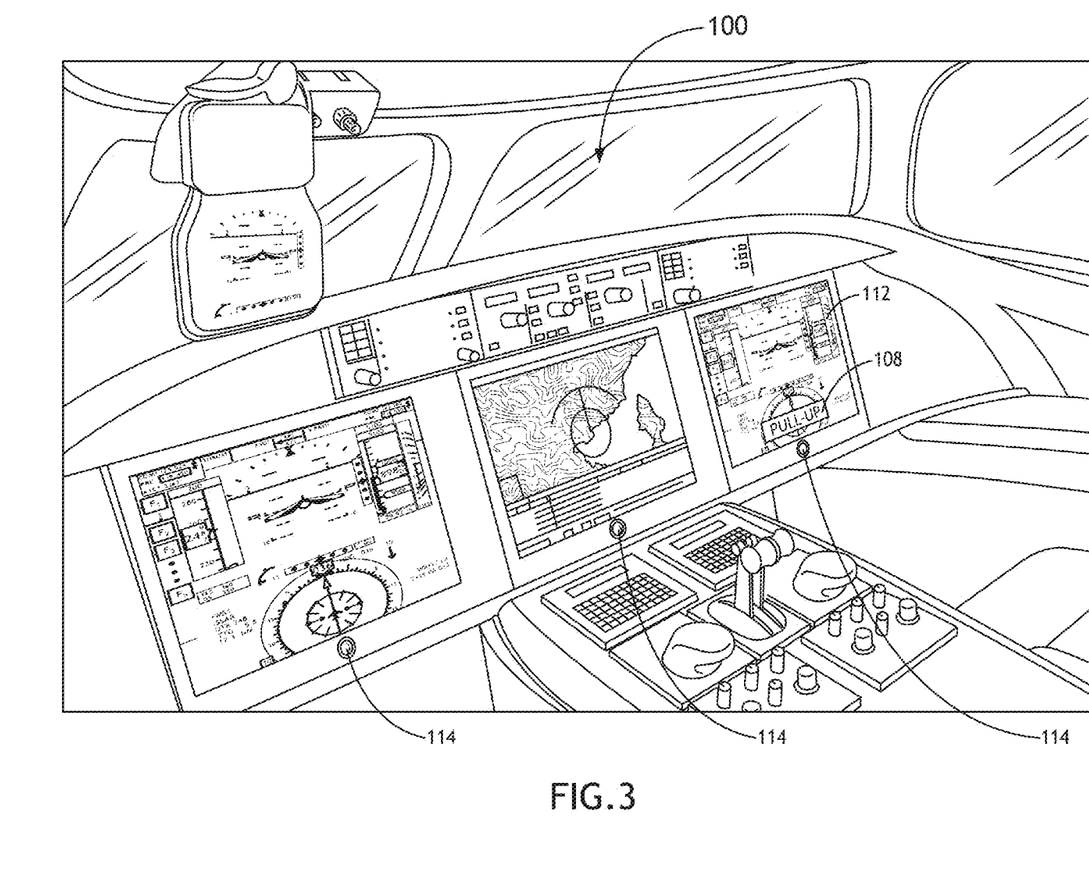
FIG. 3 is a view of a cockpit including a system for presenting an alert to a pilot.
Figure 4:
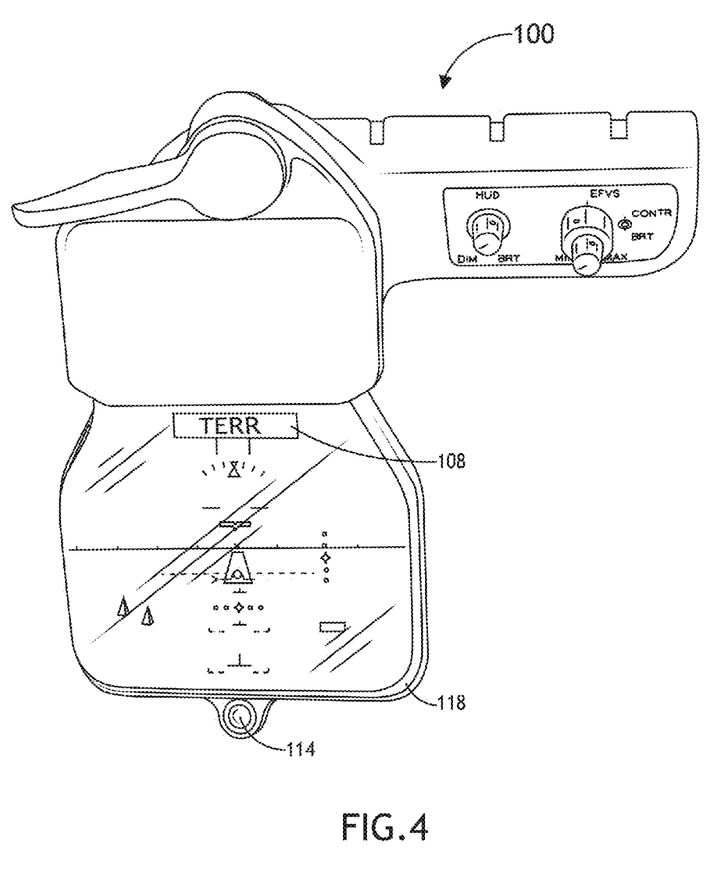
FIG. 4 is an example of an alert displayed on a Head Up Display as part of the system for presenting an alert to a pilot.

An example of the system 100 is provided in FIG. 2. The pilot 110 is currently viewing a display 112 within the cockpit. The eye tracking system may include a plurality of sensors 114 which detect the gaze 116 of the pilot 110. The alert 108 is then presented on the display 112 that is currently within the view of the pilot 110. The alert 108 may be presented on any display 112 within the cockpit, depending on where the pilot is currently looking. For example, FIG. 3 shows the alert 108 on display 112. In addition, the alert 108 may be presented on a head up display 118, as shown in FIG. 4, if the pilot is currently viewing the head up display 118. Similarly, the alert 108 may be presented on a head down display if the pilot is currently viewing a head down display.

The indicator system 106 shown in FIG. 1 may be implemented within existing display systems on the aircraft. For example, the indicator system 106 may present the alert 108 on an existing flight management display within the cockpit. The indicator system 106 may overlay the alert 108 on the existing display. In another embodiment, the indicator system 106 shown in FIG. 1 may be implemented on a new display system on the aircraft, or with a combination of existing displays and new displays. The indicator system 106 may present alerts and other information outside of the primary flight display but within the current view of the pilot. For example, if the pilot is currently looking at a kneeboard writing something down or looking back at the rear panel of the cockpit, the indicator system 106 is configured to provide the alert outside of the primary display system for the aircraft.

In one embodiment, the eye tracking system 102 and the indicator system 106 may be configured to detect a precise location of the pilot's gaze 116 within a portion of the display 112, and to present the alert 108 within that specific portion of the display 112. In another embodiment, the alert 108 may be presented at a top portion of the display 112 or in a suitable location within the display 112 that is clearly in view of the pilot 110 but that does not obstruct other critical information on the display 112.

The eye tracking system 102 may include any suitable eye tracking system 102 that may be implemented in an aircraft. For example, the eye tracking system 102 may include a non-contact system for measuring eye motion, such as a sensor or a plurality of sensors. In another embodiment, the eye tracking system 102 includes an attachment to the eye such as a contact lens for measuring the movement of the eye. In one example, the eye tracking system 102 is incorporated within an existing helmet or mask system used by the pilot. In another example, the eye tracking system includes a plurality of sensors distributed throughout the cockpit. In another embodiment, the eye tracking system 102 includes a sensor placed around the eyes to measure movement. It is understood that the type of eye tracking system 102 is not limited to the examples described and any suitable technology for detecting a gaze of a pilot may be used with the system 100. The eye tracking system 102 may be configured to detect the pilot's gaze across a horizontal plane as well as a vertical plane, and within a field of view spanning up to 360 degrees in azimuth and elevation providing a spherical field of eye tracking coverage.

The processor 104 is in communication with the eye tracking system 102 as shown in FIG. 1, and is configured to receive the current view of the pilot from the eye tracking system 102. The processor 104 is also configured to receive a plurality of alerts for the aircraft. The plurality of alerts may be derived from multiple on board systems for the aircraft, such as the Terrain Awareness and Warning System (TAWS), Traffic Collision Avoidance System (TCAS), Crew Alerting System (CAS), Surface Management System (SMS), Flight Management System (FMS), Flight Control System (FCS), Ground Proximity Warning System (GPWS), Radar Warning Receiver (RWR), threat warning systems, training warnings, weather warnings, onboard sensors, off board sensors, an off board safety monitor, and the like. The processor 104 may be in communication with the alerting systems for the aircraft, as well as other on board and off board communication systems.

The processor 104 is configured to receive the plurality of alerts for the aircraft, prioritize the alerts, and identify an alert having a highest priority of the plurality of alerts. Determining an alert having a highest priority of the plurality of alerts may be based on an existing decision tree or algorithm used for setting priority in avionics. In another embodiment, determining an alert may be determined using new algorithms, or existing algorithms augmented by new algorithms. The priority determination of the alerts may relate to the criticality of the failure, with higher risk alerts having a higher priority. Similarly, alerts may be ordered based on whether they are pre-prioritized, re-prioritized, or first time prioritized. Alerts may also be ordered based on the system they relate to—for example, the crew alerting system, the engine, the electrical system, etc. The priority determination of the alerts may also take into account the root cause of the alert. The root cause information may also be communicated to the pilot along with the alert. The priority determination may also be based on the phase of flight, for example taxi, take off, ascending, descending, or landing. In one embodiment, the priority determination of the alerts may also be based upon a pilot driven interface and determined based on the pilot's point of reference in order to make operations easier for the pilot.

In one embodiment, only the highest priority alerts are communicated to the pilot using the system 100. In another embodiment, alerts or other communications having less than critical level or priority may also be presented to the pilot using the system 100.

The alert 108 may include a master warning, a master caution, a Pull Up alert, a terrain alert, an engine alert, or any other alert type important or useful to a pilot.

The processor 104 may include any suitable computer processor. The processor 104 may be implemented as a separate system, or incorporated within an existing system on the aircraft, such as the Flight Management System or the Crew Alerting System.

The processor 104 is also in communication with the indicator system 106. The indicator system 106 is configured to receive the alert 108 having the highest priority and present the alert 108 having the highest priority within the current view of the pilot. The indicator system 106 may accomplish this by displaying the alert 108 on an existing display on the aircraft. The indicator system 106 may also include a separate display system, or be configured to work within both a separate display system and the existing display system. The display may include a display device for displaying graphical, video, photographic, and textual information to a pilot. For example, the display may be a screen, multi-function display, monitor, cathode ray tube, liquid crystal display, head up display, head down display, projector, plasma, flat panel or any other type of display suitable for an aircraft cockpit. The display may also be configured to receive inputs from an operator such as requests, information, or commands through an input system, for example.

The system 100 may be further configured to receive input from the pilot. The input may include an acknowledgement of the alert, a response to the alert, or a request for additional information in connection with the alert. The pilot may provide input to the system 100 via any suitable input system. For example, the pilot may provide input via tactile feedback or haptic technology, such as through touching a button, a touch screen, a multi-touch surface, a pressure-triggered screen with a stylus, a keyboard, mouse, a haptic device incorporating a tactile sensor, or any other suitable device for receiving inputs from a pilot. The pilot may also provide input to the system 100 via the eye tracking system 102.

The system 100 may be further configured to provide additional information relevant to the alert to the pilot. The additional information may be provided automatically based on the type of alert, or in response to an input from the pilot in connection with the alert. For example, if there is an engine fire, an engine fire alert may be presented on a display that is in the current view of the pilot. Additional information may also be provided, such as a checklist from the Pilot Operations Handbook with the key steps for responding to the engine fire. The pilot may control the checklist using the input system, the eye tracking system 102, or a combination of both. For example, the checklist may be presented on a display that is within the current view of the pilot, and the pilot may tab through the display, select items or change a focus indicator, either through the eye tracking system 102, a tactile input system, or a combination of both.

The system 100 may also be used to review and complete the Electronic Checklist for the aircraft. The processor 104 may be configured for running Electronic Checklist software and is further in communication with on board and off board systems for completing the Electronic Checklist. The eye tracking system 102 detects a current view of the pilot and may be further configured to receive inputs from the pilot. For example, the indicator system 106 may display the Electronic Checklist, and the pilot may scroll up and down the page by adjusting his gaze, as detected by the eye tracking system 102. Similarly, the system 100 may be configured to allow the pilot to tab through different pages of the Electronic Checklist using the eye tracking system 102.

In addition, the system 100 may be used with the Flight Management System of the aircraft. For example, the pilot may tab through pages of the Flight Management System by looking at specific fields within the Flight Management System. The system 100 may also be incorporated as part of a goal-based Flight Management System. For example, the system 100 may be useful in meeting the goal of providing effective flight crew notifications. Similarly, the system 100 may be useful in other goal-based Flight Management System applications.

The system 100 may be used to provide notifications to more than one pilot or crew member. For example, the eye tracking system 102 may be configured to detect a current view of the pilot and also to detect a current view of a co-pilot or other crew member. The indicator system 106 is configured to provide the alert or other information to each of the pilot and the co-pilot within their respective views. In addition, the system 100 may be used to provide alerts to other operators on the aircraft such as a specific alert to a specific operator based on the operator's job description. For example, the system 100 may provide the pilot in command with all alerts while providing a systems operator with specific systems-based alerts.

The system 100 may be used on a variety of aircraft, such as civilian aircraft, military aircraft, helicopters, regional jets, business jets, and other aircraft. The system 100 may also be useful in other vehicles or contexts where it is useful to provide a notification directly to a user's field of view.

Figure 5:
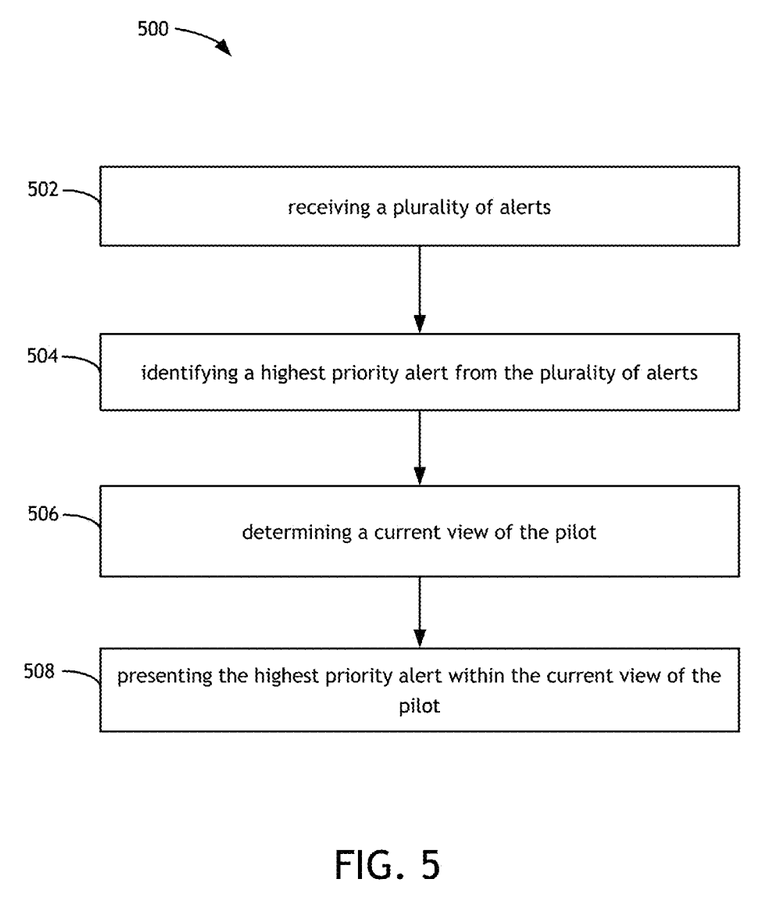
FIG. 5 is a flow diagram of a method for providing an alert to a pilot.

The present disclosure is also directed to a method 500 for providing an alert to a pilot as shown in FIG. 5. The method 500 includes the step of receiving a plurality of alerts 502. The method 500 also includes the step of identifying a highest priority alert from the plurality of alerts 504. An additional step of the method includes determining a current view of the pilot 506. The method also includes the step of presenting the highest priority alert within the current view of the pilot.

The method 500 may include additional steps in one embodiment. For example, the method 500 may also include the step of receiving a response to the alert. The response may be received from the pilot, an on board system or sensor, an off board system or sensor, or an off board operator.

In one embodiment, the method 500 may be implemented as part of a goal based flight management system to accomplish the goal of providing alerts or information to the flight crew.

The method 500 may be used to provide alerts to the pilot or other members of the flight crew. The method 500 may also be used to provide additional information within the current view of the pilot or flight crew.

Figure 6:
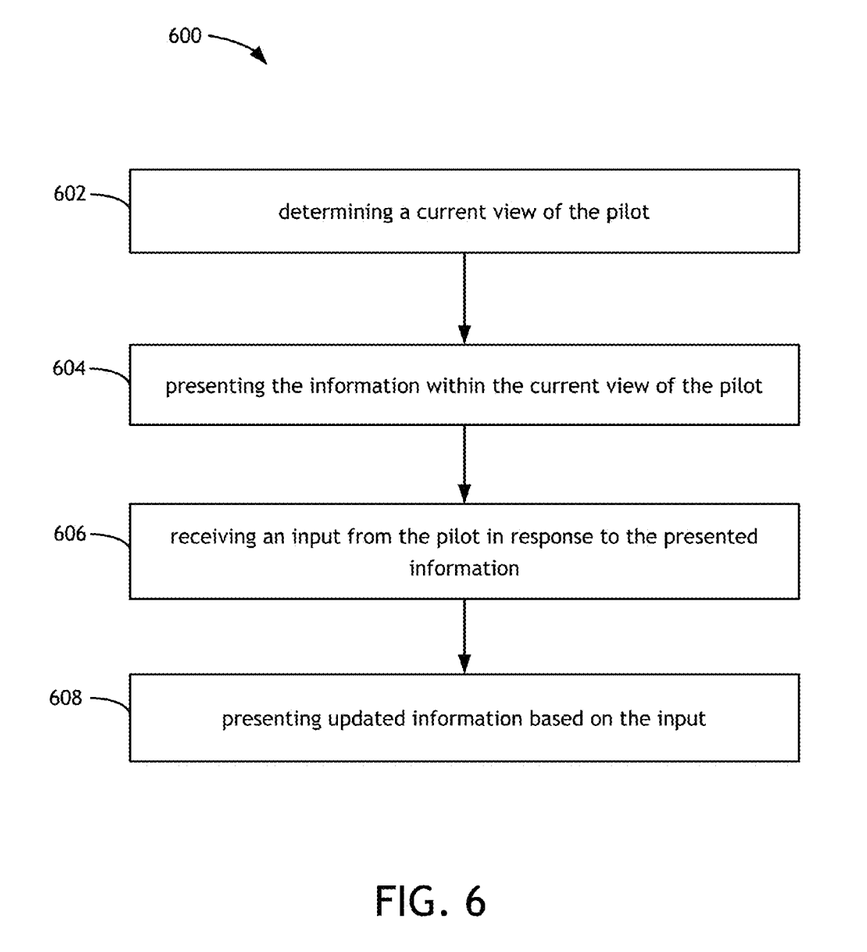
FIG. 6 is a flow diagram of a method for providing information to a pilot.

The present disclosure is also directed to a method 600 for providing information to a pilot as shown in FIG. 6. The method 600 includes the step of determining a current view of the pilot 602 and presenting the information within the current view of the pilot 604. The method 600 also includes the step of receiving an input from the pilot in response to the presented information 606. An additional step of the method includes presenting updated information based on the input 608.

The systems and methods of the present disclosure may provide several advantages. First, the systems and methods of the present disclosure may improve a pilot's response time to a critical or time sensitive alert by providing the alert directly to the pilot's current field of view. This may prevent the pilot from giving attention to less critical alerts because he has not yet become aware of a more critical alert. In addition, the systems and methods of the present disclosure provide a more centralized alert and notification system for pilots who are required to monitor several applications that provide alerts.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for providing an alert to a pilot, comprising:
  receiving a plurality of alerts;
  identifying a highest priority alert from the plurality of alerts;
  determining a current gaze of the pilot to be within a precise location of a display using an eye tracking system;
  presenting the highest priority alert within the precise location of the display;
  presenting additional information related to the highest priority alert within the precise location of the display; and
  receiving an input in response to the highest priority alert, wherein the additional information is presented in response to the input.

2. The method as claimed in claim 1, wherein identifying the highest priority alert from the plurality of alerts comprises ordering the plurality of alerts according to at least one of: a level of criticality, a system from which an alert of the plurality of alerts is received, a root cause of the alert, and a phase of flight, and wherein the highest priority alert and the additional information are presented within the precise location of the display without obstructing critical information on the display.

3. The method as claimed in claim 1, wherein the input comprises at least one of an acknowledgment of the highest priority alert, a response to the highest priority alert or a request for the additional information related to the highest priority alert.

4. The method as claimed in claim 1, wherein the presenting the highest priority alert within the precise location of the display includes presenting the highest priority alert on at least one of: a head up display, a head down display or a helmet mounted display.

5. The method as claimed in claim 1, wherein the presenting the highest priority alert within the precise location of the display includes presenting the highest priority alert on a Flight Management System display.

6. The method as claimed in claim 1, wherein the method is implemented on a goal based Flight Management System.

7. The method as claimed in claim 1, wherein the precise location is a portion of two or more portions of a screen of a display system comprising two or more screens, wherein the highest priority alert and the additional information are presented within the portion of the screen of the display system viewed by the pilot, and wherein the additional information comprises a displayed step to be performed to respond to the highest priority alert.

8. A system for presenting an alert to a pilot, the system comprising:
   an eye tracking system, the eye tracking system configured to detect a precise location of a display corresponding to a current gaze of the pilot;
   a processor in communication with the eye tracking system, the processor configured to receive the precise location of the display corresponding to the current gaze of the pilot, the processor further configured to receive a plurality of alerts for the aircraft and to prioritize the plurality of alerts, the processor further configured to identify an alert having a highest priority of the plurality of alerts and generate additional information related to the highest priority alert;
   an indicator system in communication with the processor, the indicator system configured to receive and present the highest priority alert and the additional information within the precise location of the display; and
   an input system in communication with the processor, the input system configured to receive an input from the pilot, wherein the the additional information is related to the highest priority alert and is presented in response to the input.

9. The system as claimed in claim 8, wherein the indicator system is configured to present the highest priority alert and the additional information on at least one of: a head up display or a helmet mounted display.

10. The system as claimed in claim 8, wherein the indicator system is configured to present the highest priority alert and the additional information on a Flight Management System display.

11. The system as claimed in claim 8, wherein the additional information comprises at least one of an acknowledgment of the highest priority alert, a response to the highest priority alert, or a request for updated information.

12. The system as claimed in claim 8, wherein the eye tracking system includes a non-contact eye tracking system.

13. The system as claimed in claim 8, wherein the processor is in communication with at least one of: a Terrain Awareness and Warning System (TAWS), a Traffic Collision Avoidance System (TCAS), a Crew Alerting System (CAS), a Surface Management System (SMS), a Flight Management System (FMS), a Flight Control System (FCS), a Ground Proximity Warning System (GPWS), a Threat Warning System, and a Radar Warning System.

14. The system as claimed in claim 8, wherein the input system is further configured to receive the input from the pilot using at least one of: the eye tracking system, a tactile feedback system, a haptic technology system, a touch screen, a multi-touch surface, a pressure-triggered screen with a stylus, a keyboard, or a mouse.

15. The system as claimed in claim 8, wherein the additional information is controlled via the input system.

16. A method for presenting information to a pilot or a crew member, comprising:
   determining a current gaze of the pilot or a current gaze of the crew member to be within a precise location of a screen using an eye tracking system;
   prioritizing information for presentation on the screen;
   determining a type of the highest priority information;
   presenting the highest priority information automatically based on the type of the highest priority information respectively within the precise location of the screen viewed by the pilot or the crew member;
   receiving an input from the pilot or the crew member in response to the highest priority information; and
   presenting additional information within the precise location based on the input.

17. The method as claimed in claim 16, wherein the highest priority information includes an Electronic Checklist for the aircraft or updated information based on the input.

18. The method as claimed in claim 17, wherein the input from the pilot or the input from the crew member includes at least one of: an acknowledgment of the highest priority information, a response to the highest priority information, or a request for additional information related to the highest priority information.

19. The method as claimed in claim 16, wherein the prioritized information includes information from a Flight Management System, and wherein the highest priority information is presented at least partially based on a job description of the pilot or the crew member.

20. The method as claimed in claim 19, wherein the highest priority information presented comprises a first page of a multi-page Electronic Checklist for the aircraft, and presenting the additional information based upon the input comprises presenting a second page of the multi-page Electronic Checklist.

* * * * *